United States Patent [19]

Kishinami et al.

[11] 4,175,896
[45] Nov. 27, 1979

[54] BALL ENDMILL

[75] Inventors: Tateshi Kishinami, Sapporo; Makoto Sato, Kanagawa, both of Japan

[73] Assignees: Toshiba Tungaloy Co., Ltd., Sapporo; Makino Milling Machine Co., Ltd., Kanagawa, both of Japan

[21] Appl. No.: 926,023

[22] Filed: Jul. 19, 1978

[30] Foreign Application Priority Data

Jul. 25, 1977 [JP] Japan ............................ 52-88935
Jul. 25, 1977 [JP] Japan ............................ 52-88936
Aug. 8, 1977 [JP] Japan ............................ 52-94852
Aug. 13, 1977 [JP] Japan ............................ 52-97297

[51] Int. Cl.² ...................... B23B 51/00; B23B 51/14; B26D 1/12
[52] U.S. Cl. ................................ 408/230; 407/40; 407/53; 408/239 R
[58] Field of Search ............... 408/224, 229, 230, 239; 407/40, 48, 53, 54

[56] References Cited
U.S. PATENT DOCUMENTS

| 271,646 | 2/1883 | Martignoni | 407/54 |
| 3,213,716 | 10/1965 | Getts | 408/229 |
| 3,443,459 | 5/1969 | Mackey et al. | 408/230 |
| 3,540,323 | 11/1970 | Rishel | 407/40 |
| 3,633,258 | 1/1972 | Szabo | 407/48 |
| 3,670,380 | 6/1972 | Moore et al. | 407/40 |
| 4,093,392 | 6/1978 | Hopkins | 407/48 |
| 4,132,493 | 1/1979 | Hosoi | 407/53 |

Primary Examiner—Harrison L. Hinson
Attorney, Agent, or Firm—Frishauf, Holtz, Goodman and Woodward

[57] ABSTRACT

A ball endmill comprises a cylindrical body and a cutting element secured to one end of the cylindrical body. The face of the cutting element is convexed and forms a part of the surface of an imaginary cone, the axis of which is inclined to the axis of the cylindrical body. The cutting element is constituted by one or more parts and has at least one arcuate cutting edge. The cutting edge has its starting point located near the axis of the cylindrical edge and cuts in a workpiece a spherical concave as the cylindrical body is rotated.

To cut a deep hole with a spherically curved bottom, the ball endmill may be provided with an auxiliary cutting element. The auxiliary cutting element is secured to the periphery of the cylindrical body and has a straight cutting edge extending parallel to the axis of the cylindrical body. The straight cutting edge cuts a straight cylindrical hole in a workpiece as the cylindrical body is rotated.

6 Claims, 23 Drawing Figures

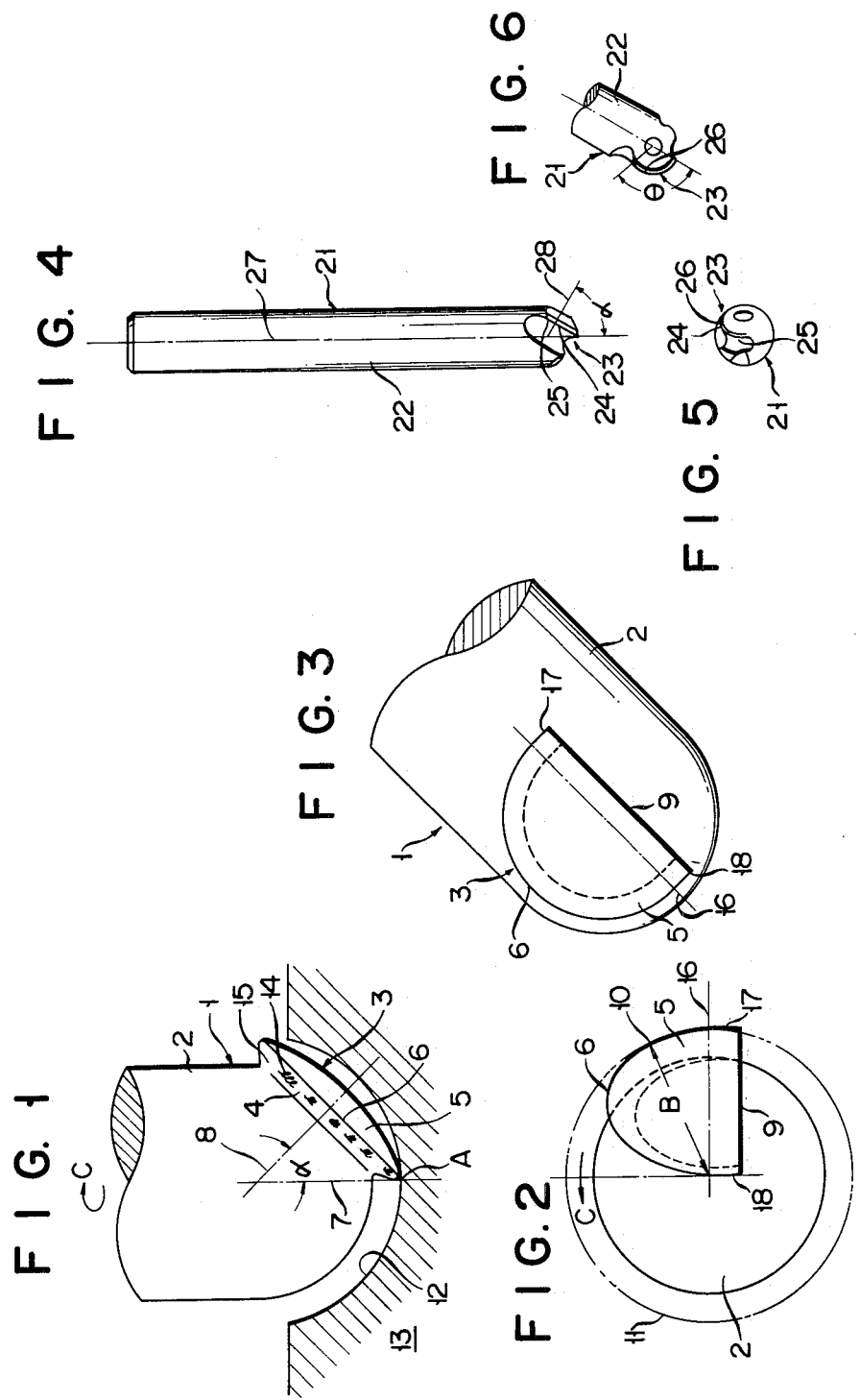

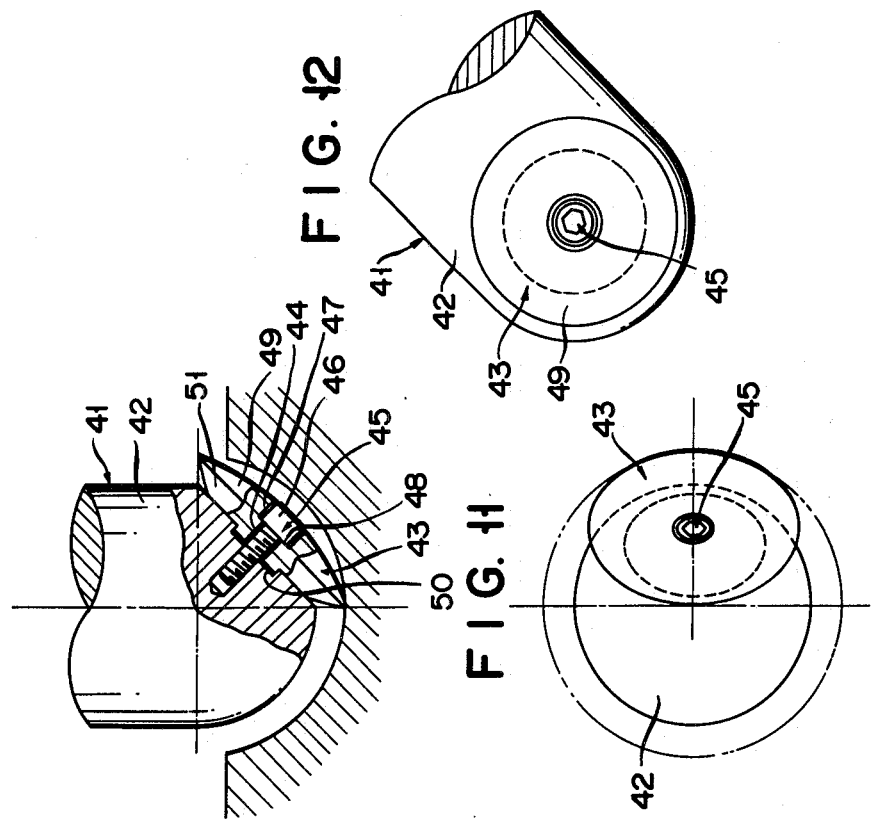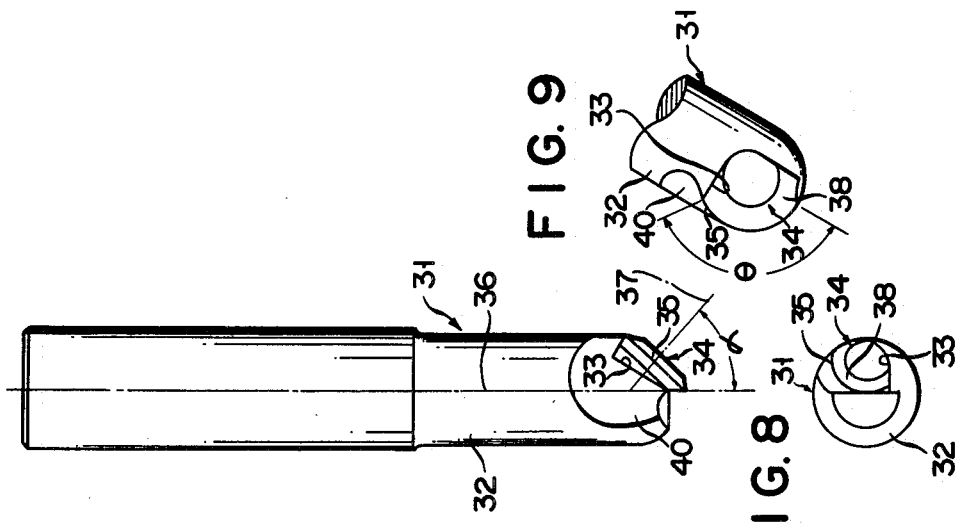

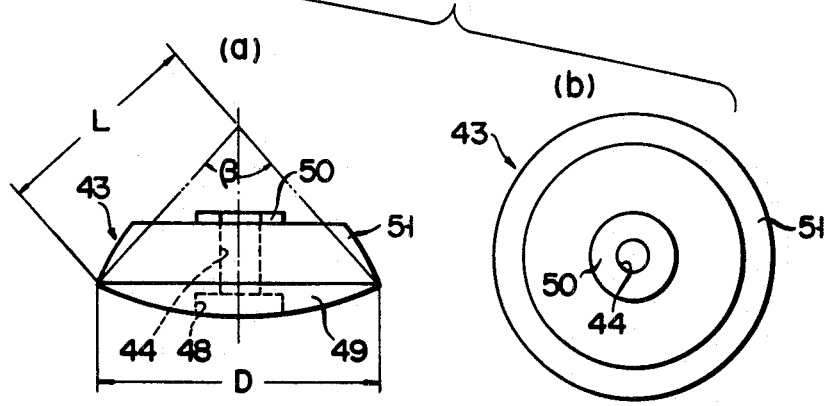
FIG. 13
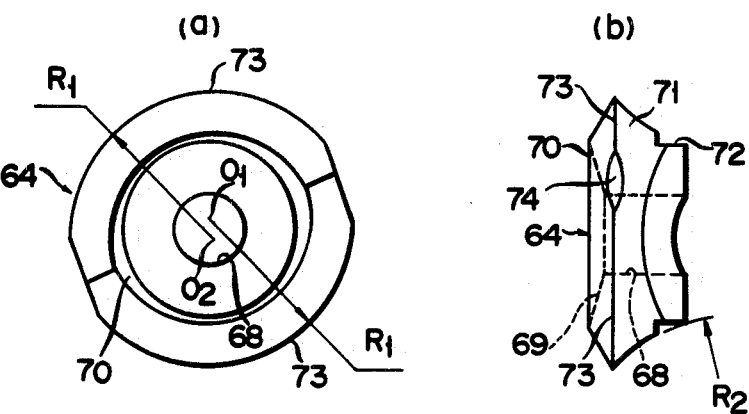
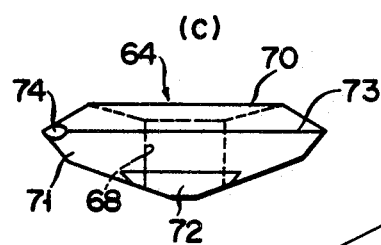
FIG. 18

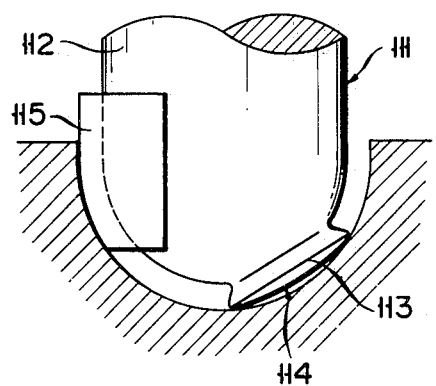
FIG. 19
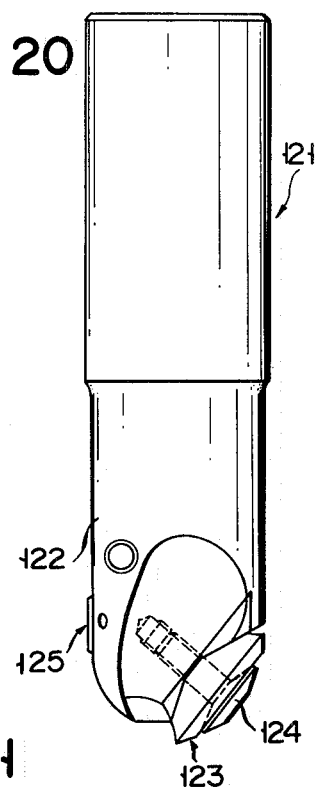
FIG. 20
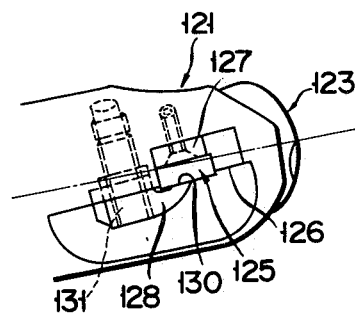
FIG. 23
FIG. 21
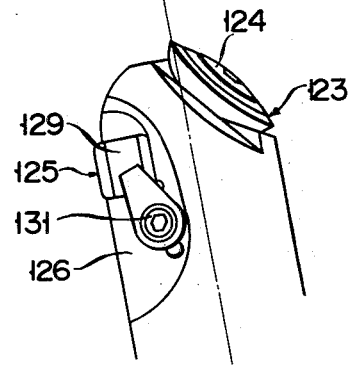
FIG. 22

BALL ENDMILL

BACKGROUND OF THE INVENTION

This invention relates to a ball endmill, particularly to a ball endmill provided with an arcuate cutting edge and able to perform an effective cutting.

Various ball endmills are known, one of which is disclosed in U.S. Pat. No. 3,409,965. The ball endmill according to the U.S. patent comprises a cylindrical body and a U-shaped tip made of a cemented carbide and brazed to the cylindrical body. Such a known ball endmill proves effective in cutting a shallow groove or hole in a workpiece.

Ball endmills are used generally to cut metal moulds, automatically controlled by a program recorded on a tape. The cutting conditions are changing, and often the ball endmills are so operated as to cut a deep groove or hole in the workpiece. The ball endmills should therefore be so designed as to achieve a deep cutting as well as a shallow cutting. In designing a ball endmill which can effect both shallow and deep cuttings, it is necessary to take into consideration the shape of a cutting edge, the mechanical strength of a cutter, the removal of chips and other factors. In short, an improved ball endmill which can cut a workpiece smoothly despite ever-changing cutting conditions is desired very much today.

SUMMARY OF THE INVENTION

An object of this invention is to provide a ball endmill which can cut in a workpiece a wide groove or a large hole, either shallow or deep, in a stable manner despite ever-chaning cutting conditions.

Another object of the invention is to provide a ball endmill whose cutting element has an arcuate cutting edge so designed as to reduce cutting resistance, thereby elevating the cutting efficiency of the ball endmill.

A further object of the invention is to provide a ball endmill having at least one cutting element, which is integrally formed with a cylindrical body, brazed to the cylindrical body, or detachably secured to the cylindrical body, or detachably secured to the cylindrical body.

Still another object of the invention is to provide a ball endmill having a cutter which is either integrally formed with a cylindrical body or brazed to the cylindrical body and which can be sharpened so as to cut always a smooth spherical concave.

Still another object of the invention is to provide a ball endmill having a cutting element which is detachably secured to a cylindrical body and which can be replaced by another cutting element of different size, whereby the ball endmill can cut in a workpiece spherical concaves of different diameters with a predetermined range.

A further object of the invention is to provide a ball endmill having a main cutting element and an auxiliary cutting element which is so designed to cut a straight deep hole effectively in a workpiece, thereby achieving a stable cutting and elevating the cutting efficiency of the ball endmill.

The above-mentioned objects and other objects of this invention and the chracterizing features of the invention will be fully understood if the description set forth hereinafter is read with reference to the accompanying drawings. The drawings are to illustrate this invention, but the invention is not limited to the embodiments shown in them.

BRIEF DESCRIPTION OF THE DRAWINGS

FIG. 1 is a front view of the main part of a ball endmill according to this invention;

FIG. 2 is a plan view of the ball endmill shown in FIG. 1, as viewed from the bottom thereof;

FIG. 3 is a side view of the ball endmill shown in FIG. 1, as viewed slantwise from the bottom thereof;

FIG. 4 is a front view of a ball endmill with relativelly small diameter according to the invention, provided with a cutting element integrally formed with a cylindrical body;

FIG. 5 is a plan view of the ball endmill shown in FIG. 4, as viewed from the bottom thereof;

FIG. 6 is a side view of the ball endmill shown in FIG. 4, as viewed slantwise from the bottom thereof;

FIG. 7 is a front view of another embodiment of the invention, provided with a cutting element brazed to a cylindrical body;

FIG. 8 is a plan view of the ball endmill shown in FIG. 7, as viewed from the bottom thereof;

FIG. 9 is a side view of the ball endmill shown in FIG. 7, as viewed slantwise from the bottom thereof;

FIG. 10 is a front view of a ball endmill of throwaway type according to the invention, provided with a cutting element secured to a cylindrical body by means of a screw;

FIG. 11 is a plan view of the ball endmill shown in FIG. 10, as viewed from the bottom thereof;

FIG. 12 is a side view of the ball endmill shown in FIG. 10, as viewed slantwise from the bottom thereof;

FIG. 13(a) is a side view of the cutting element of the ball endmill shown in FIGS. 10, 11 and 12;

FIG. 13(b) is a plan view of the cutting element shown in FIG. 13(a);

FIG. 18(a) is a plan view of the cutting element of the ball endmill shown in FIGS. 14, 15 and 16;

FIG. 18(b) is a side view of the cutting element shown in FIG. 18(a);

FIG. 18(c) is another side view of the cutting element shown in FIG. 18(a), as viewed at a different angle;

FIG. 19 is front view of main part of a ball endmill according to the invention, provided with a main cutter and an auxiliary cutter;

FIG. 20 is a front view of a ball endmill of throwaway type according to the invention, provided with a main cutter secured to a cylindrical body by means of a screw and an auxiliary cutter secured to the cylindrical body means of a clamping device;

FIG. 21 is a plan view of the ball endmill shown in FIG. 20, as viewed from the bottom thereof; and FIGS. 22 and 23 are side views of the ball endmill shown in FIG. 20.

DETAILED DESCRIPTION OF THE PREFERRED EMBODIMENTS

Figure 14:
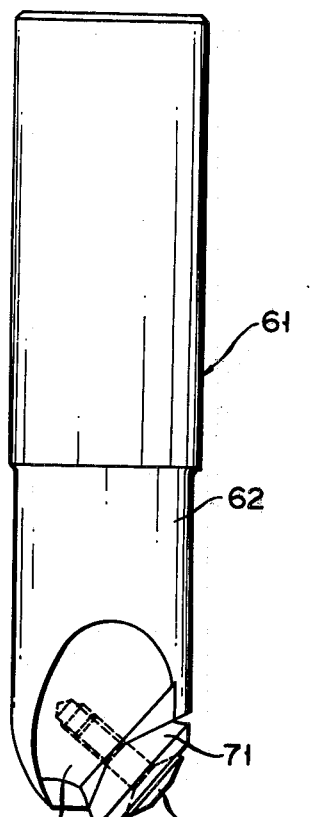
FIG. 14 is a front view of another ball endmill of throwaway type according to the invention.

A ball endmill 1 as shown in FIGS. 1 to 3 comprises a cylindrical body 2 and a cutter 3 attached to the top of the body 2. Preferably, the cutter 3 is made of cemented carbide, Cermet or the like. It is secured to the cylindrical body 2 either by brazing or a clamping member. Of course, the cutting element 3 may be integrally formed with the cylindrical body 2.

The cutting element 3 has a face 4 and a flank 5. The face 4 is a convex surface contigeous to the cylindrical body 2. The boundary between the face 4 and the flank 5 makes an arcuate cutting edge 6. The face 4 is a part of the surface of an imaginary cone whose axis 8 is inclined to the axis 7 of the cylindrical body 2.

One starting point A of the cutting edge 6 is placed on the axis 7 of the body 2 so that the cutting element 3 cuts a workpiece to form a spherical concave as the body 2 is rotated. It is desired that the axis 8 of the imaginary cone should intersect with the axis 7 of the body 2 at such an angle that the point A of the cutting edge 6 is positioned on the axis 7. The angle $\alpha$ at which the axis 8 is inclined to the axis 7 ranges from 5° to 70°. The cutting edge 6 forms an arc of about 180° to 360°. As shown in FIGS. 2 and 3, the side 9 of the cutting element 3 opposite to the arcuate cutting edge 6 extends substantially straight and parallel to the axis 16 of the body 2.

As the cylindrical body 2 is rotated, each point on the cutting edge 6, for example a point 10 shown in FIG. 2, draws a circuit, e.g. circle 11 in FIG. 2 whose radius is the distance, e.g. distance B in FIG. 2, between it and the axis 7 of the cylindrical body 2. As a result, the entire cutting edge 6 forms a spherical concave in the workpiece. This means that any corss section of the resultant spherical concave is circular, if taken along a plane perpendicular to the axis 7 of the cylindrical body 2.

Accordingly, if the body 2 is coupled to the main shaft (not shown) of a machine tool and rotated in direction C shown in FIG. 2, and fed in the direction of the axis 7 the cutting element 3 will form a spherical concave 12 in a workpiece 13. During the cutting process, chips 14 move along the face 4 of the cutting element 3 and are finally removed outside the concave 12 from the upper end 15 of the face 4. In this way the cutting element 3 achieves a three-dimensional cutting in the workpiece 13. Since the cutting element 3 cuts the workpiece 13 very deep, the cutting can be carried out with a high efficiency.

Of the arcuate cutting edge 6, only that portion above line 16 in FIG. 2 works to cut the workpiece 13. The other arc portions 17 and 18 do not serve to cut the workpiece 13. These portions 17 and 18 will therefore be called "ineffective cutter" hereinafter.

With reference to FIGS. 4 to 6, a ball endmill 21 with small diameter according to this invention will be described.

The ball endmill 21 comprises a cylindrical body 22 and a cutting element 23, both made of a cemented carbide and formed integrally. The cylindrical body 22 has a diameter of 3 mm to 10 mm. The cutting element 23 is formed on the tip of the body 22 by cutting. The cutting element 23 has a cutting edge 24, a face 25 and a flank 26. The cutting edge 24 is inclined to the axis 27 of the body 22. The face 25 communicates with a chip pocket (not shown) so that chips may be put into the chip pocket smoothly. The flank 26, which is an annular surface, defines the cutting edge 24 jointly with the face 25. The flank 26 is a part of the surface of an imaginary cone whose axis 28 is inclined to the axis 27 of the body 22 at 60° (angle $\alpha$), and the cutting edge 24 forms an arc of 110° (angle $\theta$).

The ball endmill 21 can cut in a carbon steel workpiece a groove the width of which is about half the diameter of the cylindrical body 22 at cutting speed of 60 m/min and at feed speed of 0.6 to 0.9 m/min. Namely, the ball endmill 21 can cut a groove at feed speed two to three times the feed speed possible with the conventional ball endmills.

FIGS. 7 to 9 shows another ball endmill 31 according to this invention, wherein a cutting element 34 is brazed to a cylindrical body 32. The diameter of the cylindrical body 32 is 6 mm or more. The top portion of the body 32 is cut slantwise to form a cutter base 33, onto which the cutting element 34 is brazed. The cutting element 34 has a cutting edge 35, a flank 38 and a face 39. The flank 38 is an annular surface, a part of the surface of an imaginary cone whose axis 37 is inclined at 45° (angle $\alpha$) to the axis 36 of the cylindrical body 32. The cutting edge 35 forms an arc of 130° (angle $\theta$). The face 39 is contigeous to a chip pocket 40 formed in the tip portion of the body 32.

The condition under which the ball endmill 31 cuts a workpiece, e.g. feed speed and cutting speed, are similar to the cutting conditions of the ball endmill 21 shown in FIGS. 4 to 6. The cutting edge 35 can be easily sharpened merely by grinding the flank 38.

A further ball endmill 41 according to this invention is illustrated in FIGS. 10 to 12. This ball endmill 41 is a throwaway type one.

The ball endmill 41 comprises a cylindrical body 42 and a cutting element 43 which is shaped like a disc. The cutting element 43 has a central through hole 44 and is secured to the cylindrical body 42 by means of a screw 45. The head 46 of the screw 45 is to rest in a spot face 48 of the hole 44, so that chips may be removed smoothly. On the side opposite to the flank 49 of the cutting element 43 there is formed a protrusion 50 which serves to attach the cutting element 43 firmly to the cylindrical body 42.

The dimensional features of the cutting element 43 will be described with reference to FIG. 13, wherein "D" and "L" denote the diameter of the cutter 43 and the length of the generating line of an imaginary cone, respectively. The relation between D and L is expressed by the following formula:

$D = 2L \sin \beta/2$ ($\beta$: apex angle of the imaginary cone).

Various cutters were made and tested, and it was found that the apex angle could be 10° to 160°. When the apex angle was about 10°, chips could not be removed smoothly and a three-dimensional cutting could not be effected successfully. On the other hand, when the apex angle $\beta$ was about 160°, the cutter appeared to be broken. In view of this, the cutter, if made of a cemented carbide alloy, seems to cut a workpiece effectively when the apex angle $\beta$ ranges from 60° to 120° or a little more. It was also found that the cutter worked most effectively when the ratio of L to D (i.e. L/D) ranged from 0.5 to 1.0.

As shown in FIG. 13, the face 51 of the cutting element 43 is a convex surface.

Figure 15:
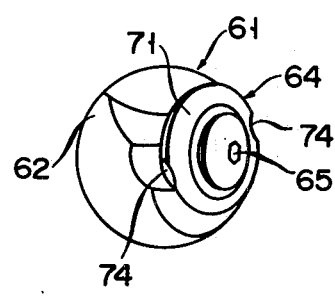
FIG. 15 is a plan view of the ball endmill shown in FIG. 14, as viewed from the bottom thereof.

FIGS. 14 to 15 shows another ball endmill 61 according to the invention, which is a throwaway type one and provided with a cutting element having two cutting edges.

Figure 17:
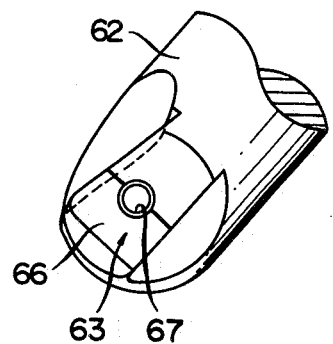
FIG. 17 is a side view of the ball endmill shown in FIG. 14, with a cutting element removed.

The ball endmill 61 comprises a cylindrical body 62 provided with a cutter base 63 at the tip and a disc-shaped cutter 64 secured to the cutter base 63 by means of a screw 65. As shown in FIG. 17, the cutter base 63 have two flat faces 66 which define a V-groove. In its central part the cutter base 63 has a screw hole 67 to receive the screw 65 in screw engagement. The V-groove defined by the flat faces 66 is to support the cutter 64. As clearly illustrated in FIGS. 17 and 18, the cutter 64 has a central through hole 68 having a spot face 69. The side of the cutter 64, where the spot face 69 is formed, works as a flank 70. The flank 70 consists of a first flank which is an annular surface and a second flank which is a circular surface.

The side of the cutter 64, which is opposite to the flank 70, works as a face 71. The face 71 is the surface of a cone 72 whose apex angle is, for example, 140°. The boundary between the first flank and the face 71 works as a cutting edge 73. The diametrically symmetric parts of the cutting edge 73 are cut off, thereby forming two flat faces 74 parallel to each other. As a result, the cutting edge 73 is divided into two cutting edges. These cutting edges 73 cuts a spherical concave in a workpiece as the cylindrical body 72 is rotated. The arcuate cutting edges 73 have the same radius $R_1$, but their centers $O_1$ and $O_2$ are displaced as shown in FIG. 18. The parallel faces 74 function as flanks in order to avoid mutual interference of the cutting edges 73. When the ball endmill 61 is used, only one of the cutting edges 73 serves to cut a workpiece.

The face 71 is a part of the surface of an imaginary cone, but is not a flat surface. It is a slightly concave surface and is made contiguous to a chip pocket 75 formed in the cylindrical body 72. In FIG. 18(b), the concave surface, i.e. the face 71 is defined by radius $R_2$.

The ball endmill 61 as described above can cut grooves in carbon steel in such a manner as shown in the following table.

Table

| Diameter of Cutter | Cutting speed | Feed | Depth | Workpliece |
| --- | --- | --- | --- | --- |
| 25 mm | 86 m/min | 500 mm/min | 6 mm | S45C |
| 25 mm | 86 m/min | 300 mm/min | 12.5 mm | S45C |

S45C is a carbon steel for machine structural use containing 0.42–0.45 C in Japanese Industrial Standard.

FIG. 19 shows a ball endmill 111 according to the invention which is effective in cutting in a workpiece a relatively deep hole with a spherically curved bottom. The ball endmill 111 comprises a cylindrical body 112, a main cutter 114 with an arcuate cutting edge 113 and an auxiliary cutter 115. The main cutter 114 is secured to the tip portion of the body 112, and the auxiliary cutter 115 to the periphery of the body 112. The auxiliary cutter 115 is a plate and brazed to the cylindrical body 112.

Figure 16:
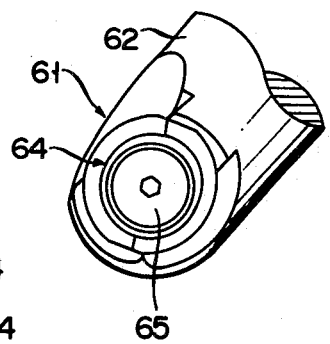
FIG. 16 is a side view of the ball endmill shown in FIG. 14, as viewed slantwise from the bottom thereof.

A further ball endmill 121 shown in FIGS. 20 to 23 is a throwaway type one and similar to the ball endmill 61 shown in FIGS. 14 to 16. But it differs in that it is provided with two cutters. That is, the ball endmill 121 comprises a cylindrical body 122, a main cutter 123 secured to the body 122 by means of a screw 124 and an auxiliary cutter 125 secured to the body 122. The main cutter 123 and the screw 124 are identical with the cutter 64 and screw 65 of the ball endmill 61, respectively.

The auxiliary cutter 125 is constituted by a square plate and is disposed in a concave 126 formed in the cylindrical body 122. It is supported on a shim 127 and secured to the body 122 by a clamping device 128. The auxiliary cutter 125 is put in contact with the body 122 on its side where a face 129 is formed. The clamping device 128 is used to secure the auxiliary cutter 125 to the body 122 since the concave 126 is small. If the cylindrical body 122 is thick, a larger concave can be formed and the auxiliary cutter 125 can be secured to the body 122 by means of a screw just like the main cutter 123. In this case, the auxiliary cutter 125 may be constituted by a rectangular plate, insteed of a square plate. The clamping device 128 comprises a hollow cylinder with a clamping claw 130. By means of a double thread screw 131, the claw 130 is pushed onto the face 129 of the auxiliary cutter 125. Other types of clamping devices can of course be used to secure the auxiliary cutter 125 to the body 122.

The ball endmill 121 can bore in a workpiece a deep hole with a spherically curved bottom since the main cutter 123 cuts a spherical concave and the auxiliary cutter 125 cuts a straight cylindrical hole.

In all the above-described embodiments, only one cutter is provided at the tip of the cylindrical body. Instead, two or more cutters may be integrally formed of, brazed to, or detachably secured to, the tip of the cylindrical body.

What we claim is:

1. A ball endmill comprising a cylindrical body and a cutting element provided with one end of the cylindrical body and having a face and at least one arcuate cutting edge, said face being convexed and forming a part of the surface of an imaginary cone whose axis is inclined to the axis of the cylindrical body, and said arcuate cutting edge having a starting point located near the axis of the cylindrical body so as to cut a part or all of a spherical concave in a workpiece as the cylindrical body is rotated.

2. A ball endmill according to claim 1, said cylindrical body and cutting element are integrally formed and made of a cemented carbide.

3. A ball endmill according to claim 1, wherein said cylindrical body is made of steel, and said cutting element is made of at least one cemented carbide and brazed to said cylindrical body.

4. A ball endmill according to claim 1, wherein said cutting element is constituted by a substantially truncated cone made of a cemented carbide and having a central through hole and is secured to a cutter base of said cylindrical body by means of a screw, using said central through hole.

5. A ball endmill according to claim 4, wherein said cutting element has two arcuate cutting edges which are eccentric to each other and separated from each other by diametrically symmetric flat faces.

6. A ball endmill comprising a cylindrical body, a main cutter secured to one end of the cylindrical body and having a face and at least one arcuate cutting edge, and an auxiliary cutter secured to the periphery of the cylindrical body and having a straight cutting edge, said face being convexed and forming a part of the surface of an imaginary cone whose axis is inclined to the axis of the cylindrical body, said arcuate cutting edge having a starting point located near the axis of the cylindrical body so as to cut a part or all of a spherical concave in a workpiece as the cylindrical body is rotate, and said straight cutting edge cuts a straight cylindrical hole in the workpiece as the cylindrical body is rotated.

* * * * *